Patented Aug. 24, 1937

2,090,927

UNITED STATES PATENT OFFICE 2,090,927

ORGANIC MERCURY COMPOUNDS

Carl N. Andersen, Watertown, Mass., assignor to Lever Brothers Company, a corporation of Maine No Drawing. Application January 21, 1935, Serial No. 2,756

16 Claims. (Cl. 260—13)

The present invention relates to the production of certain new organic mercury compounds, particularly aromatic mercury derivatives of oxygenated hydroaromatic compounds.

It is an object of my invention to produce new organic mercury compunds useful as germicides and for other therapeutic purposes.

I have discovered that if the essential radical of an aromatic mercury compound, consisting of an aromatic nucleus to which mercury is directly attached, is introduced into certain hydroaromatic derivatives, particularly oxygenated hydroaromatic derivatives, or attached to the corresponding radicals, compounds are produced which have extraordinarily high potency as antiseptics and germicides and at the same time are characterized by relatively low toxicity and other desirable properties.

The compounds I have produced may be described as having the general formula $(RHg)_xR_1$ in which R repersents an aromatic structure, to a carbon atom of which the mercury is directly attached; in which $x$ represents the number of RHg groups in the compound which may be one or more; and in which $R_1$ represents the radical corresponding to the oxygenated hydroaromatic derivative, which radical is linked to the RHg radical, in most instances through the replacement of hydrogen. While the word "group" is used hereinafter, it is obvious that it is to be understood as plural where the value of $x$ is more than one.

R represents an aromatic structure which may be an aromatic nucleus with or without side chains, and the expression "aromatic structure" used herein is intended to be generic to and include an aromatic nucleus with or without side chains. The aromatic structure is one of the type in which none of the nuclear or side chain carbon atoms has direct linkage with any element other than hydrogen, carbon or mercury. R may stand for the phenyl group, $C_6H_5$, or an aromatic hydrocarbon having a nucleus similar to the phenyl hydrocarbons, as for example, polycyclic hydrocarbons in which all of the nuclear carbon atoms, other than the one attached to mercury, and any side chain carbon atoms, have their valences satisfied by either carbon or hydrogen. Examples are the diphenyl, tolyl, xylyl and naphthyl groups.

The parent hydrocarbon of the hydroaromatic compounds is hexahydrobenzene,

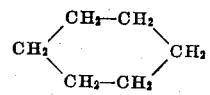

The oxygenated derivatives thereof, above referred to, include the ketones, such as cyclo hexanone,

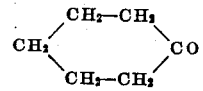

the alcohols, such as hexahydrophenol,

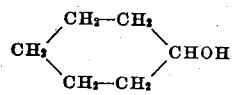

and quinite (cyclohexane 1,4 diol),

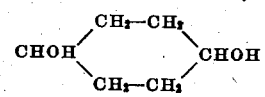

and the acids, such as hexahydrobenzoic acid (naphthenic),

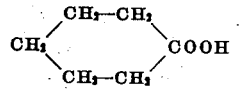

and hexahydro-p-phthalic acid,

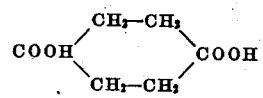

In the polyhydroxy and the polycarboxylic compounds the radicals may be located in the ortho, meta and para positions.

The terpenes are one of the principal constituents of the hydroaromatic group and the following are examples of terpenes and their oxygenated derivatives:

The terpenogen group comprises the terpene (myrcene), $C_{10}H_{16}$; the aldehyde (citronellal), $(CH_3)_2C=CH-CH_2-CH_2-C(CH_3)H-CH_2-CHO$; the alcohol (citronellol), $(CH_3)_2C=CH-CH_2-CH_2-C(CH_3)H-CH_2-CH_2OH$; and the acid (citronellic acid), $(CH_3)_2C=CH-CH_2-CH_2C-(CH_3)H=CH-COOH$.

The menthan group comprises the terpene (limonene or dipentene), $C_{10}H_{16}$; the ketone (menthone),

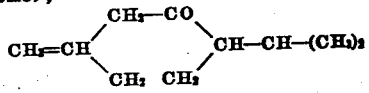

the alcohol, (menthol),

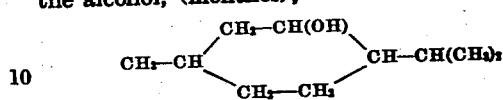

and the acid (oxomenthylic acid),

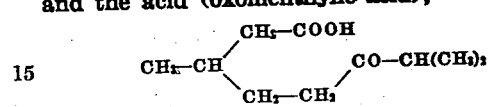

The camphan group comprises the terpene (camphene) $C_{10}H_{16}$; the ketone (camphor),

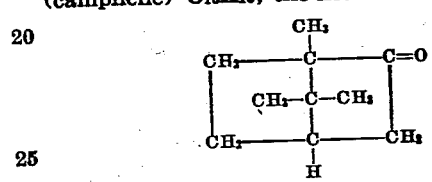

the alcohol (camphol),

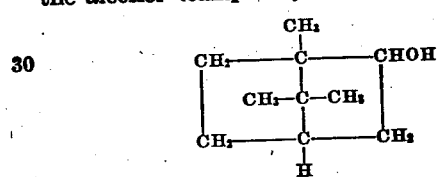

and the acid (camphoric acid),

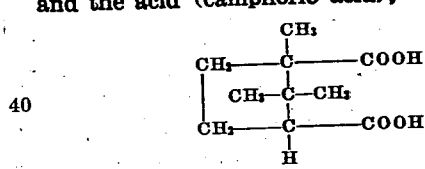

Other oxygenated terpene derivatives of similar structure are camphoronic acid,

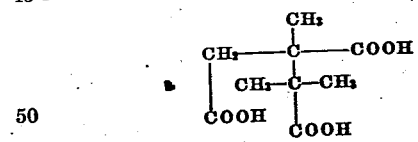

and linoleic acid,

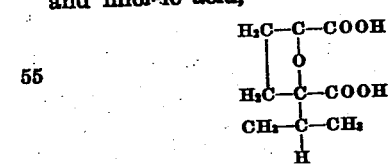

By the expressions "oxygenated hydroaromatic compound" and "oxygenated terpene", as used in the claims hereinafter, I mean compounds of the respective general or particular types containing only hydrogen, oxygen and carbon which are hydroaromatic hydrocarbons to which oxygen has been added, or in which one or more atoms have been replaced by oxygen, and which contain one or more replaceable hydrogen atoms linked through oxygen.

In producing my novel mercury compounds I introduce the aromatic mercury radical into the oxygenated hydroaromatic derivative by reacting the oxygenated hydroaromatic derivative with a soluble aromatic mercury compound containing an aromatic mercury radical of the RHg type.

This compound is preferably the hydroxide, or a soluble salt, such as the acetate or lactate. In my applications Serial Nos. 694,198 and 694,199, filed October 18, 1933, I have disclosed the general methods of preparing aromatic mercury compounds by utilizing the hydroxide or soluble salt in the manner above described. I may employ either of these processes in producing the compounds embodied in the present invention.

The hydroaromatic hydrocarbons themselves do not react readily with the aromatic mercury compounds. Their oxygenated derivatives, however, react more readily, particularly the alcohol and the acid derivatives. I believe that in the reaction with the acid derivatives, it is the hydrogen of the COOH group that is replaced by the monovalent aromatic mercury radical RHg— to form a salt. In the case of the alcohol, I believe that the H of the OH group is replaced by the RHg radical to form an alcoholate. In the case of the other oxygenated derivatives such as aldehydes and ketones I have not been able to definitely establish the structure of the final product or identify the mechanism of the reaction, and I prefer not to speculate as to what it might be.

I have prepared a sufficiently representative number of these compounds to lead me to believe that all the compounds of the above identified class can be employed to produce my novel mercury compounds. The compounds so prepared have, in greater or lesser, but always in relatively high degree, desirable antiseptic and germicidal properties. I therefore intend my invention to be generic and include all of the above described oxygenated hydroaromatic compounds their homologues and equivalents.

Compounds other than those mentioned above which I have prepared include the aromatic mercury cyclo hexyl maleates and the aromatic mercury cyclo hexyl phenols.

The compounds may be prepared in various ways. The following examples are given as illustrative of a method by which all of the compounds of this class may be prepared, and as illustrative of organic mercury derivatives of oxygenated hydroaromatic compounds:

*Example 1*

17.64 grams of phenylmercury hydroxide is dissolved in 1 liter of water and heated until solution is complete. The solution is then filtered to remove any insoluble material. To the filtrate is added 7.68 grams of hexahydrobenzoic (cyclo hexane carboxylic or naphthenic) acid dissolved in 50 cc. of alcohol. A white insoluble precipitate results at once. This is separated by filtration, washed and dried. Upon recrystallizing it from alcohol the material melts at 181.5–182.5° C., and is the compound phenylmercury hexahydrobenzoate.

In the above procedure the synthetically prepared acid is employed. The process may be also carried out with naphthenic acids obtained from petroleum, for example, Roumanian crude. This initial compound is probably a mixture of isomers and polymers of naphthenic acids. The aromatic mercury compound obtained therefrom is a crystalline paste which is somewhat more difficult to obtain in pure form.

*Example 2*

17.64 grams of phenylmercury hydroxide is dissolved in 1 liter of alcohol and heated until solution is complete. The solution is then filtered to remove any insoluble material. To the filtrate is added 6 grams of hexahydrophenol (cyclo hexanol). The solution is evaporated to dryness and the residue then redissolved and recrystallized from alcohol. White crystals are obtained which sinter at 195° C. and wet the melting point tube of 198–207° C. Upon heating the compound further it turns opaque at 240° C. and does not melt up to 255° C. The compound is the phenylmercury alcoholate of hexahydrophenol.

Example 3

17.64 grams of phenylmercury hydroxide is dissolved in 1 liter of alcohol and heated until solution is complete. To the solution is added 8.58 grams of menthol and heated for a few minutes, after which the solution is filtered. The solution is evaporated to dryness and the resulting material recrystallized from alcohol. The material softens at 207° C. and forms a semi-solid liquid at 211.5° C. Upon further heating it solidifies at 221° C. and does not melt up to 250° C. The compound is the phenylmercury alcoholate of menthol.

Example 4

17.64 grams of phenylmercury hydroxide is dissolved in 4 liters of water and heated until solution is complete. The mixture is filtered to remove any insoluble material. To the filtrate is added 6.6 grams of camphoric acid dissolved in a 50% alcohol-water solution. A white milky mixture results which is allowed to stand for 12 hours and the white residue separates on the bottom. The mixture is filtered, and the precipitate washed and dried. It melts at 175–180° C. The compound is phenylmercury camphorate.

From the description of the specific examples, it will be readily apparent to one skilled in the art how the other members of the oxygenated hydroaromatic derivative group may be reacted with an aromatic mercury compound to produce aromatic mercury oxygenated hydroaromatic derivatives of analogous structure.

Theoretical quantities of the reacting materials are generally employed. In some instances, if desired, approximately 10% excess of the hydroaromatic derivative may be used in order to insure the complete conversion of the phenylmercury compound.

The process may be carried out at any temperature, for example, room temperature. In most cases I find, however, that the use of heat facilitates the solution of the reacting components and speeds the reaction. For these reasons it is generally desirable to employ heat. Any solvent in which the reacting components are soluble may be used as a medium for carrying out the reaction. If the reacting components are water soluble, water is generally used for reasons of convenience, but if not, other solvents such as the alcohols, acetone or mixtures of these with each other or with water may be employed.

All of the compounds produced as above described are characterized by extraordinarily high potency as germicides. Tests to determine their efficacy in killing *B. typhosus* and *Staph. aureus* were carried on under the following conditions:

Aqueous solutions of varying dilutions from 1:10,000 upward until killing ceased, were made up.

These dilutions were employed in the conduct of the tests by the following methods:

Circular 198, U. S. Dept. of Agriculture, Dec. 1931, described as F. D. A. method against *Eberthella typhi* (typhoid bacillus) at 37° C. and F. D. A. special method against *Staph. aureus* at 37° C.

As illustrative of the potentcy of the compounds, the killing power of the following compounds is given merely as illustrative:

The figures represent the maximum dilutions at which killing in 15 minutes resulted:

|  | B. typhosus | Staph. aureus |
| --- | --- | --- |
| Phenylmercury derivative of menthol | 1:80,000 | 1:20,000 |
| Phenylmercury derivative of hexahydrobenzoate | 1:60,000 | 1:10,000 |

In addition to their high germicidal value, all of these compounds are characterized by relatively low toxicity. Because of these properties it is possible to use them in extreme dilutions and in many situations where known germicides, because of toxic or other undesired properties, can not be employed. They may be used externally and locally, and in some cases administered internally with satisfactory results from the germicidal standpoint and without harmful effect to the body or its functions.

The compounds retain their germicidal activity when incorporated in soap and various menstruums employed in preparing germicidal compositions.

When these new compounds are to be used directly as germicides they may be employed in aqueous or other solutions or they may be formed into various preparations such as mouth washes, tooth pastes, soaps, ointments, etc.

I claim:

1. A new organic compound of the general formula $(RHg)_xR_1$, in which R represents an aromatic structure to a carbon atom of which the mercury is directly attached, and in which none of the carbon atoms has direct linkage with any element other than hydrogen, carbon and mercury; in which $R_1$ represents a radical corresponding to an oxygenated hydroaromatic compound composed entirely of hydrogen, oxygen and carbon and containing a hydrogen atom linked through oxygen and replaceable by an RHg group; and in which $x$ is the number of RHg groups in the compound and is an integer representing the number of said replaceable hydrogen atoms in said oxygenated hydroaromatic compound.

2. A new organic compound of the general formula $(RHg)_xR_1$, in which R represents an aromatic structure to a carbon atom of which the mercury is directly attached, and in which none of the carbon atoms has direct linkage with any element other than hydrogen, carbon and mercury; in which $R_1$ represents a radical corresponding to an oxygenated terpene containing a hydrogen atom linked through oxygen and replaceable by an RHg group; and in which $x$ is the number of RHg groups in the compound and is an integer representing the number of said replaceable hydrogen atoms in said oxygenated terpene.

3. A new organic compound of the general formula $(RHg)_xR_1$, in which R represents an aromatic structure to a carbon atom of which the mercury is directly attached, and in which none of the carbon atoms has direct linkage with any element other than hydrogen, carbon and mercury; in which $R_1$ represents a radical corresponding to a carboxylic acid of a hydroaromatic hydrocarbon that is linked to the RHg group through the replacement of the acidic hydrogen atom and in which $x$ is the number of RHg groups in the compound and is an integer representing the number of said acidic hydrogen atoms in said carboxylic acid.

4. A new organic compound of the general formula $(RHg)_xR_1$, in which R represents an aromatic structure to a carbon atom of which the mercury is directly attached, and in which none of the carbon atoms has direct linkage with any element other than hydrogen, carbon and mercury; in which $R_1$ represents a radical corresponding to a carboxylic acid of a terpene that is linked to the RHg group through the replacement of the acidic hydrogen atom and in which $x$ is the number of RHg groups in the compound and is an integer representing the number of said acidic hydrogen atoms in said carboxylic acid.

5. A new organic compound of the general formula $(RHg)_xR_1$, in which R represents an aromatic structure to a carbon atom of which the mercury is directly attached, and in which none of the carbon atoms has direct linkage with any element other than hydrogen, carbon and mercury; in which $R_1$ represents a radical corresponding to an alcohol of a hydroaromatic hydrocarbon that is linked to the RHg group through the replacement of the hydroxyl hydrogen atom and in which $x$ is the number of RHg groups in the compound and is an integer representing the number of said hydroxyl hydrogen atoms in said alcohol.

6. A new organic compound of the general formula $(RHg)_xR_1$, in which R represents an aromatic structure to a carbon atom of which the mercury is directly attached, and in which none of the carbon atoms has direct linkage with any element other than hydrogen, carbon and mercury; in which $R_1$ represents a radical corresponding to an alcohol of a terpene that is linked to the RHg group through the replacement of the hydroxyl hydrogen atom and in which $x$ is the number of RHg groups in the compound and is an integer representing the number of said hydroxyl hydrogen atoms in said alcohol.

7. A new organic compound of the general formula $(C_6H_5Hg)_xR_1$, in which $R_1$ represents a radical corresponding to an oxygenated hydroaromatic compound composed entirely of carbon, hydrogen and oxygen and containing a hydrogen atom linked through oxygen and replaceable by a $C_6H_5Hg$ group; and in which $x$ is the number of $C_6H_5Hg$ groups in the compound and is an integer representing the number of said replaceable hydrogen atoms in said oxygenated hydroaromatic compound.

8. A new organic compound of the general formula $(C_6H_5Hg)_xR_1$, in which $R_1$ represents a radical corresponding to an oxygenated terpene containing a hydrogen atom linked through oxygen and replaceable by a $C_6H_5Hg$ group; and in which $x$ is the number of $C_6H_5Hg$ groups in the compound and is an integer representing the number of said replaceable hydrogen atoms in said oxygenated terpene.

9. A new organic compound of the general formula $(C_6H_5Hg)_xR_1$, in which $R_1$ represents a radical corresponding to a carboxylic acid of a hydroaromatic hydrocarbon that is linked to the $C_6H_5Hg$ group through the replacement of the acidic hydrogen atom and in which $x$ is the number of $C_6H_5Hg$ groups in the compound and is an integer representing the number of said acidic hydrogen atoms in said carboxylic acid.

10. A new organic compound of the general formula $(C_6H_5Hg)_xR_1$, in which $R_1$ represents a radical corresponding to a carboxylic acid of a terpene that is linked to the $C_6H_5Hg$ group through the replacement of the acidic hydrogen atom and in which $x$ is the number of $C_6H_5Hg$ groups in the compound and is an integer representing the number of said acidic hydrogen atoms in said carboxylic acid.

11. A new organic compound of the general formula $(C_6H_5Hg)_xR_1$, in which $R_1$ represents a radical corresponding to an alcohol of a hydroaromatic hydrocarbon that is linked to the $C_6H_5Hg$ group through the replacement of the hydroxyl hydrogen atom and in which $x$ is the number of $C_6H_5Hg$ groups in the compound and is an integer representing the number of said replaceable hydroxyl hydrogen atoms in said alcohol.

12. A new organic compound of the general formula $(C_6H_5Hg)_xR_1$, in which $R_1$ represents a radical corresponding to an alcohol of a terpene that is linked to the $C_6H_5Hg$ group through the replacement of the hydroxyl hydrogen atom and in which $x$ is the number of $C_6H_5Hg$ groups in the compound and is an integer representing the number of said replaceable hydroxyl hydrogen atoms in said alcohol.

13. A new compound of the general formula $(C_6H_5Hg)_xR_1$, in which $R_1$ represents a radical corresponding to an acid of a terpene.

14. Phenylmercury camphorate.

15. The phenylmercury alcoholate of menthol.

16. Phenylmercury hexahydrobenzoate.

CARL N. ANDERSEN.